Patented Nov. 24, 1925.

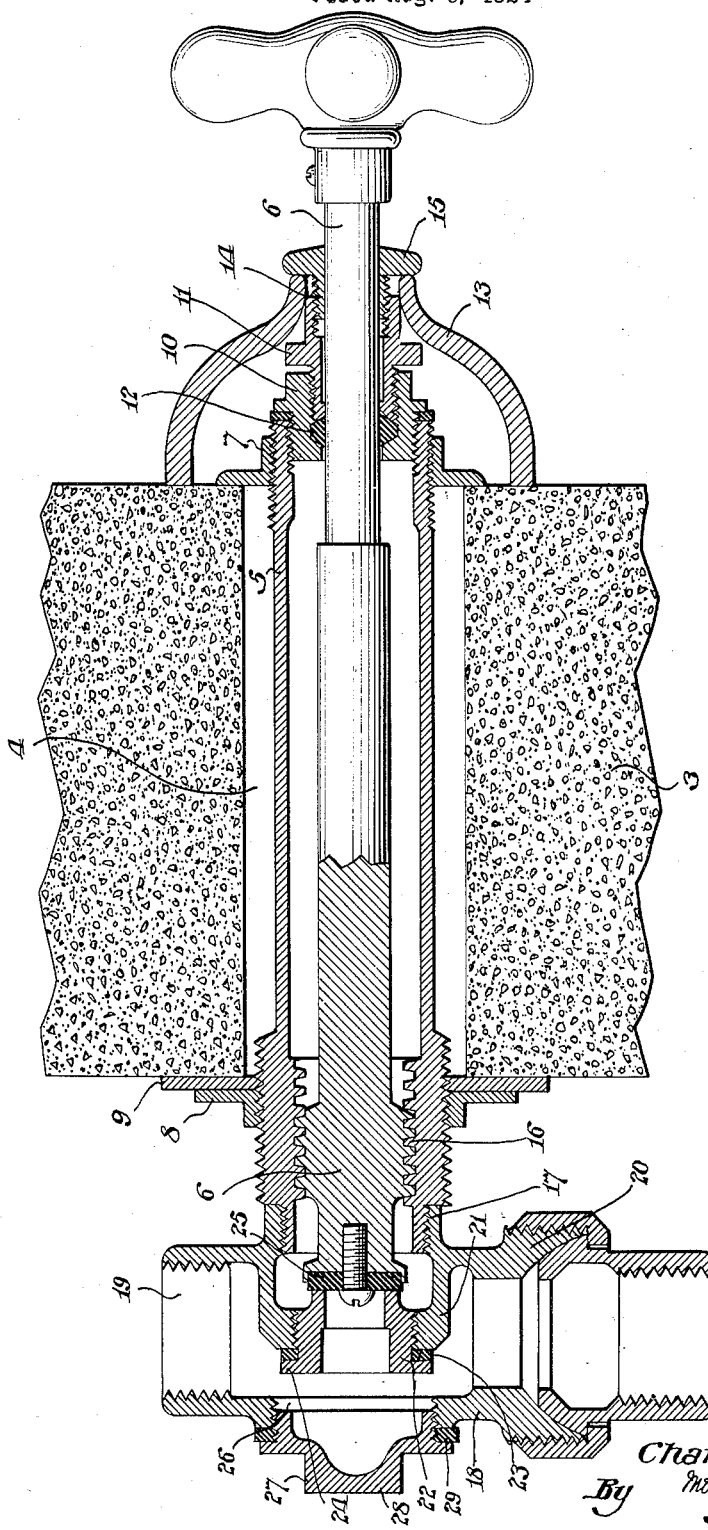

1,562,981

UNITED STATES PATENT OFFICE.

CHARLES J. MUEND, OF PHILADELPHIA, PENNSYLVANIA, ASSIGNOR TO HAINES, JONES & CADBURY INCORPORATED, A CORPORATION OF PENNSYLVANIA.

VALVE STRUCTURE.

Application filed August 6, 1924. Serial No. 730,365.

*To all whom it may concern:*

Be it known that I, CHARLES J. MUEND, a citizen of the United States, residing at Philadelphia, in the county of Philadelphia, State of Pennsylvania, have invented a new and useful Valve Structure, of which the following is a specification.

My invention relates to improvements in valve structure. The object is to provide a structure having the valve and valve seat readily accessible, and so that the same may be removed, for repairing or renewing, without disturbing any other parts of the structure. The invention is especially applicable for such structures, as for example bath valves, in which all the operating parts of the valve are concealed behind the wall, except the operating handle and the outer end of the valve stem. In such structures the valve casing is positioned so that the same extends through a wall into a channel or pipe chase, behind the wall, and usually accessible in a recess or room outside the bath room, so that said repairs or renewals may be made without necessity for the plumber to enter the bath room, which obviously in many cases is undesirable.

This device is especially adapted for use in controlling the salt water supply for baths in seaside resorts, because the salt water, especially hot salt water, rapidly corrodes the valve seat, which renders frequent replacement necessary. In such cases it is especially desirable that these frequent replacements may be made without the necessity of the plumber entering the bath room.

Referring to the drawing, which illustrates, merely by way of example, a suitable embodiment of my invention.

The figure is a longitudinal section of the valve structure embodying my invention.

The wall 3, through which the structure passes, is provided with the recess 4, through which the tubular member 5 and the spindle 6 extend. This tubular member 5 and spindle 6 may be of any required length to accommodate the thickness of the wall 3. The member 5 is held in position by clamping nuts 7 and 8, threaded on the exteriorly threaded ends of said member 5. These nuts are provided with ample flanges for extending over the margin of recess 4; and a washer, such as 9, may be employed between the nut and the wall. By tightening the nuts 7 and 8, the tubular member 5 is held firmly in position. The end projecting through the bathroom side of the wall, for instance, is provided with a plug 10, threaded into tube 5, forming a bearing for the spindle 6 and cooperating with plug 11 in compressing the packing 12 therefor. An escutcheon 13 surrounds the outer end of spindle 6 and encloses the nut 7 and threaded plugs 10 and 11, which would otherwise be exposed to view. This escutcheon is held in position by the plug 14 threaded into plug 11, and preferably provided with the knurled head 15.

At the other end of the tubular member 5 is provided the coarse thread 16 for engaging with the threaded part of the valve spindle 6. Member 5 is also provided with the exteriorly threaded extremity 17 for engaging the chambered body 18. This chambered body 18 is provided with the threaded ends 19 and 20 for engaging with the supply and service pipes, not shown, and is also provided with a ported partition 21, between the inlet and discharge passages, having a threaded bore for receiving the valve-seat member 22. A lead washer 23 is provided for contact between the outer flange 24 of said seat-member 22 and the wall of the partition 21. This valve-seat member 22 engages in the partition 21 by a left hand thread. The seat member is adapted to cooperate with the valve 25, secured to the end of spindle 6. The purpose of the left hand thread engagement of the valve-seat member 22 with partition wall 21, is to cause the tightening of the seat-member in the partition 21, by any movement which may result from the closing movement of the engaging valve 25, when in frictional engagement with said valve-seat member 22.

At the opposite side of the outer wall of chambered body 18, is provided a port or opening 26 of diameter greater than the outside diameter of valve-seat member 22. This port is normally closed by the removable plug or other suitable closure 27, provided with suitable means, such as the angular head 28, for manipulating same, and also provided with a fibre or other suitable washer 29, for securing a leak-tight connection with the wall of chambered body 18 surrounding port 26.

It will be seen that by this structure, the opening or port 26 is on the outer or exposed side of chambered body 18, that is on the opposite side of the valve seat from that of the valve spindle and valve operating handle, and preferably in alinement with the valve and valve-seat member. This chambered body, it will be seen, is adapted to be placed outside the bath room wall, in what is known as the pipe chase. When it is desired to remove the valve seat member 22 for repair or replacement, or to remove the valve 25 for similar treatment, it is only necessary to remove the plug or closure 27, so that said seat member 22 or said valve 25 may be detached and withdrawn through the opening 26, and repairs or replacements may be made without the necessity of the plumber even entering the bathroom.

The advantage of the left hand threaded engagement between the valve seat member 22 and the partition wall 21, is that this member 22 may be arbitrarily withdrawn from said partition 21, while normally the frictional engagement with valve seat member 22, of the valve 25, turning with its spindle in the right hand thread, tends to force the seat member in direction opposite the longitudinal closing movement of the valve spindle and into tighter engagement with the partition wall 21.

What I claim is:—

1. In combination with a recessed wall, a valve structure comprising a tube extending through the recess of the wall, threaded exteriorly at each end and provided with an interiorly threaded portion between its two ends, cooperating nuts for clamping the tube to the wall, a valve spindle extending through the tube having a valve element at one end and an operating handle at the other end, and a threaded portion cooperating with the interiorly threaded portion of the tube, means forming a guide for the spindle at one end of the tube, a chambered body secured to the other end of the tube, having inlet and outlet ports and an apertured partition between said ports, a removable valve seat member threaded into said apertured partition, said chambered body also provided with an opening and a removable closure therefore in alinement with the valve seat member, as and for the purpose specified.

2. In a valve structure adapted to be concealed in a wall, having its valve operating handle and the outer end of the valve stem on one side thereof and all other operating parts within and on the other side thereof, the combination of a chambered body having inlet and discharge passages and a ported partition therebetween, a valve, a cooperating valve seat member threaded into the opening in the partition from the side opposite that on which the valve is positioned, the thread of said seat member being so directed that the frictional engagement of the valve with the seat, in the closing movement, will tend to force the seat member in direction opposite the longitudinal closing movement of the valve spindle and into tighter engagement with the partition, said chambered body also provided in its exposed wall with an opening for withdrawing the valve seat member, and a closure for said opening.

3. In combination with a recessed wall a valve structure comprising a tube extending through the recess of the wall, threaded exteriorly at each end and also interiorly at one end, and provided with an interiorly threaded portion between its two ends, cooperating flanged nuts for engaging the wall adjacent the recess and clamping the tube to the wall, a valve spindle extending through the tube having a valve element at one end and an operating handle at the other end, and a threaded portion cooperating with the interiorly threaded portion of the tube, means forming a guide and packing for the spindle at one end of the tube, a chambered body secured to the other end of the tube, having inlet and outlet ports and an apertured partition between said ports, a removable valve seat member threaded into said apertured partition, said chambered body also provided with an opening and a removable closure therefor in alinement with the valve seat member, as and for the purpose specified.

CHARLES J. MUEND.